United States Patent
Christiansson et al.

(10) Patent No.: US 9,684,414 B2
(45) Date of Patent: Jun. 20, 2017

(54) EFFICIENT TOMOGRAPHIC PROCESSING FOR TOUCH DETERMINATION

(71) Applicant: FlatFrog Laboratories AB, Lund (SE)

(72) Inventors: Tomas Christiansson, Torna-Hallestad (SE); Andreas Björklund, Lund (SE); Nicklas Ohlsson, Bunkeflostrand (SE)

(73) Assignee: FLATFROG LABORATORIES AB, Lund (SE)

( * ) Notice: Subject to any disclaimer, the term of this patent is extended or adjusted under 35 U.S.C. 154(b) by 290 days.

(21) Appl. No.: 14/383,988

(22) PCT Filed: Mar. 7, 2013

(86) PCT No.: PCT/SE2013/050197
§ 371 (c)(1),
(2) Date: Sep. 9, 2014

(87) PCT Pub. No.: WO2013/133756
PCT Pub. Date: Sep. 12, 2013

(65) Prior Publication Data
US 2015/0054759 A1 Feb. 26, 2015

Related U.S. Application Data

(60) Provisional application No. 61/608,740, filed on Mar. 9, 2012.

(30) Foreign Application Priority Data

Mar. 9, 2012 (SE) .................................. 1250219

(51) Int. Cl.
*G06F 3/042* (2006.01)
*H04M 1/725* (2006.01)
*G06F 3/041* (2006.01)

(52) U.S. Cl.
CPC ............ *G06F 3/042* (2013.01); *G06F 3/0416* (2013.01); *G06F 3/0421* (2013.01); *H04M 1/72563* (2013.01); *G06F 2203/04109* (2013.01)

(58) Field of Classification Search
None
See application file for complete search history.

(56) References Cited

U.S. PATENT DOCUMENTS 6,972,753 B1  12/2005  Kimura et al.
7,432,893 B2  10/2008  Ma et al.
(Continued)

FOREIGN PATENT DOCUMENTS

WO  WO-2009/048365 A1  4/2009
WO  WO-2010/006882 A2  1/2010
(Continued)

OTHER PUBLICATIONS

International Search Report and Written Opinion dated Aug. 22, 2013 issued in corresponding International Application No. PCT/SE2013/050197.
(Continued)

*Primary Examiner* — Carolyn R Edwards
*Assistant Examiner* — Krishna Neupane
(74) *Attorney, Agent, or Firm* — Harness, Dickey & Pierce PLC (57) ABSTRACT

Touch sensitivity is enabled using a touch system that comprises a panel configured to conduct signals, e.g. by TIR, along detection lines across a rectangular touch surface with first and second spatial dimensions. A signal processor operates to transform energy values for the detection lines into Fourier coefficients arranged as data points on a regular grid defined by first and second frequency dimensions. To generate an interaction pattern for the touch surface, the (Continued)

signal processor operates a first 1D inverse FFT on the data points with respect to the second frequency dimension, so as to generate first values transformed into the second spatial dimension, and operates a second 1D inverse FFT on a selected subset of the first values with respect to the first frequency dimension to generate second values that represent the interaction pattern. The selected subset is defined by the data points that fall within an extent of the touch surface in the second spatial dimension, thereby reducing the total number of inverse FFT operations.

18 Claims, 5 Drawing Sheets

(56) References Cited

U.S. PATENT DOCUMENTS

| | | | |
|---|---|---|---|
| 7,646,833 B1* | 1/2010 | He | H04L 25/022 348/607 |
| 8,274,495 B2 | 9/2012 | Lee | |
| 2004/0252091 A1 | 12/2004 | Ma et al. | |
| 2006/0114237 A1 | 6/2006 | Crockett et al. | |
| 2007/0075648 A1 | 4/2007 | Blythe et al. | |
| 2009/0153519 A1* | 6/2009 | Suarez Rovere | G06F 3/0421 345/173 |
| 2011/0291989 A1 | 12/2011 | Lee | |
| 2013/0044073 A1 | 2/2013 | Christiansson et al. | |
| 2013/0201142 A1 | 8/2013 | Suarez Rovere | |

FOREIGN PATENT DOCUMENTS

| | | |
|---|---|---|
| WO | WO-2010/006883 A2 | 1/2010 |
| WO | WO-2010/006884 A2 | 1/2010 |
| WO | WO-2010/006885 A2 | 1/2010 |
| WO | WO-2010/006886 A2 | 1/2010 |
| WO | WO-2010/064983 A2 | 6/2010 |
| WO | WO-2010/134865 A1 | 11/2010 |
| WO | WO-2011/139213 A1 | 11/2011 |
| WO | WO-2012/050510 A1 | 4/2012 |

OTHER PUBLICATIONS

Natterer, F. *The Mathematics of Computerized Tomography* (2001): Chapter 5.2 "Fourier Reconstruction", pp. 100-109.

Fourmont, K. "Non-Equispaced Fast Fourier Transforms with Applications to Tomography." *The Journal of Fourier Analysis and Applications*, v. 9, No. 5 (2003): pp. 431-450.

Natterer, F. and F. Wübbeling. *Mathematical Methods in Image Reconstruction* (2001): Chapter 5.2 "Fourier Reconstruction", pp. 100-109.

* cited by examiner

EFFICIENT TOMOGRAPHIC PROCESSING FOR TOUCH DETERMINATION

CROSS-REFERENCE TO RELATED APPLICATIONS

The present application is the National Phase of International Application No. PCT/SE2013/050197, filed 7 Mar. 2013, which claims priority to Swedish patent application No. 1250219-1, filed 9 Mar. 2012, and U.S. provisional application No. 61/608,740, filed 9 Mar. 2012, both of which are incorporated herein by reference.

TECHNICAL FIELD

The present invention relates to touch sensing systems and data processing techniques in relation to such systems.

BACKGROUND ART

Touch sensing systems ("touch systems") are in widespread use in a variety of applications. Typically, the touch systems are actuated by a touching object such as a finger or stylus, either in direct contact or through proximity (i.e. without contact) with a touch surface. Touch systems are for example used as touch pads of laptop computers, in control panels, and as overlays to displays on e.g. hand held devices, such as mobile telephones. A touch system that is overlaid on or integrated in a display is also denoted a "touch screen". Many other applications are known in the art.

To an increasing extent, touch systems are designed to be able to detect two or more touches simultaneously, this capability often being referred to as "multi-touch" in the art. There are numerous known techniques for providing multi-touch sensitivity, e.g. by using cameras to capture light scattered off the point(s) of touch on a panel, or by incorporating resistive wire grids, capacitive sensors, strain gauges, etc into a panel.

US2004/0252091 discloses an alternative technique which is based on frustrated total internal reflection (FTIR). Light sheets are coupled into a panel to propagate inside the panel by total internal reflection. When an object comes into contact with a surface of the panel, two or more light sheets will be locally attenuated at the point of touch. Arrays of light sensors are located around the perimeter of the panel to detect the received light for each light sheet. A coarse reconstruction of the light field across the panel surface is then created by geometrically back-tracing and triangulating all attenuations observed in the received light. This is stated to result in data regarding the position and size of each contact area.

US2009/0153519 discloses a panel capable of conducting signals. A "tomograph" is positioned adjacent to the panel with signal flow ports arrayed around the border of the panel at discrete locations. Signals measured at the signal flow ports are arranged in a sinogram (b) and tomographically processed to generate a two-dimensional representation (x) of the conductivity on the panel, whereby touching objects on the panel surface can be detected. The presented technique for tomographic reconstruction is based on a linear model of the tomographic system, $Ax=b$. The system matrix A is calculated at factory, and its pseudo inverse $A^{-1}$ is calculated using Truncated SVD algorithms and operated on a sinogram b of measured signals to yield the two-dimensional (2D) representation of the conductivity: $x=A^{-1}b$. The suggested method is both demanding in the term of processing and lacks suppression of high frequency components, possibly leading to much noise in the 2D representation. US2009/0153519 also makes a general reference to Computer Tomography (CT). CT methods are well-known imaging methods which have been developed for medical purposes. CT methods employ digital geometry processing to reconstruct an image of the inside of an object based on a large series of projection measurements through the object.

One class of CT methods use Fourier transforms for image reconstruction, based on the so-called Projection-Slice Theorem, which stipulates that a 1D Fourier transform of projection values from a projection measurement results in a slice through a 2D Fourier transform of the image to be reconstructed. Thus, a method that operates a 1D Fourier transform on a sinogram of projection values will generate Fourier coefficients for data points arranged on radial lines in the Fourier domain, i.e. on a polar grid. The image may then be reconstructed by operating a 2D Fourier transform on the Fourier coefficients for the data points. To achieve appropriate computational speed and reconstruction accuracy, it may be desirable for the data points to be arranged on a Cartesian grid in the Fourier domain, e.g. to enable the use of inverse Fast Fourier Transforms (FFTs). Numerous techniques have been developed to transform the data points to a Cartesian grid, including interpolation techniques, e.g. as described in "The Mathematics of Computerized Tomography", by F Natterer, 2001, in Chapter V. 2: "Fourier reconstruction".

A further example of an interpolation technique is described in the article "Non-Equispaced Fast Fourier Transforms with Applications to Tomography" by K Fourmont, published in "Journal of Fourier Analysis and Applications", Volume 9, Number 5, pages 431-450 (2003). This article proposes a 1D FFT, denoted 1D NER, that operates on equispaced data (the projection values) to generate a non-equispaced result (the data points in the Fourier domain). Specifically, each 1D NER is adapted to generate the data points at such locations along the radial lines in the Fourier domain, so as to allow the Fourier coefficients on the Cartesian grid to be generated by angular interpolation.

With respect to signal processing in touch systems, WO 2011/139213 discloses an improved technique for tomographic reconstruction based on signals from a touch system that operates by transmission of light inside a light transmissive panel. The signals, which represent detected energy on a plurality of detection lines across the touch surface, are processed to generate a set of matched samples, which are indicative of estimated detected energy for fictitious detection lines that have a location on the touch surface that matches a standard geometry for tomographic reconstruction. This technique enables the touch system to be designed with any arrangement of detection lines across the touch surface, while still allowing for the use of conventional tomographic reconstruction algorithms. These algorithms will generate an interaction pattern that represents the location of objects on the touch surface. With respect to existing Fourier-based reconstruction techniques, e.g. as exemplified above, the set of matched samples may form the sinogram (the projection values) that is processed by 1D Fourier transformation.

One challenge in respect of touch systems is that the interaction pattern may need to be generated in real time. This task is made even more demanding if the touch system is restricted in terms of processing speed or storage capacity, e.g. due to constraints imposed by a desire to reduce costs, limit power consumption, provide a certain form factor, etc.

SUMMARY

It is an objective of the invention to at least partly overcome one or more limitations of the prior art.

Another objective is to provide a Fourier-based technique for image reconstruction in touch systems that enables improved processing speed and/or reduced need for storage capacity.

One or more of these objectives, as well as further objectives that may appear from the description below, are at least partly achieved by means of a method of enabling touch determination, a computer program product, a device for enabling touch determination, and a touch-sensitive apparatus according to the independent claims, embodiments thereof being defined by the dependent claims.

A first aspect of the invention is a method of enabling touch determination based on an output signal from a touch-sensitive apparatus. The apparatus comprises a rectangular touch surface with first and second spatial dimensions and is configured to propagate signals across the touch surface along a plurality of detection lines. The method comprises: processing the output signal to generate a set of data samples indicative of transmitted signal energy for at least a subset of the plurality of detection lines; processing the set of data samples for transformation into Fourier coefficients arranged as data points on a regular grid defined by first and second dimension parameters that represent frequencies in the first and second spatial dimensions, respectively; and processing the data points by inverse Fourier transformation so as to generate an interaction pattern in the first and second spatial dimensions of the touch surface. The step of processing the data points comprises: operating a first one-dimensional inverse Fourier transform on the data points with respect to the second frequency dimension, so as to generate first values transformed into the second spatial dimension for the data points; and operating a second one-dimensional inverse Fourier transform on a selected subset of the first values with respect to the first frequency dimension to generate second values that represent the interaction pattern, wherein the selected subset is defined by the data points that fall within an extent of the touch surface in the second spatial dimension.

The first aspect is based on the insight that the inverse Fourier transformation not only generates the interaction pattern within the rectangular touch surface, but also results in interaction values outside of extent of the touch surface. This is an inherent property of the underlying Projection-Slice Theorem. Thus, there is a mismatch between the rectangular shape of the touch surface and the underlying theoretical framework of Fourier-based techniques for image reconstruction. The first aspect is designed to reduce the adverse effects of this mismatch in terms of processing speed and/or need for storage capacity during the computations. By limiting the processing to the selected subset, which is selected to match the desired extent of the interaction pattern in the second spatial dimension, it is possible to reduce the total number of one-dimensional inverse Fourier transforms that need to be executed when generating the interaction pattern.

In one embodiment, the extent of the touch surface in the first spatial dimension exceeds the extent of the touch surface in the second spatial dimension. Thus, the first one-dimensional inverse Fourier transform is operated to generate the first values in the minor dimension of the touch surface, thereby reducing the number of second one-dimensional inverse Fourier transforms that need to be executed.

In one embodiment, the step of operating the first one-dimensional inverse Fourier transform further comprises: storing at least part of the first values in an electronic memory, for subsequent retrieval by the step of operating the second one-dimensional inverse Fourier transform.

In one embodiment, the step of storing at least part of the first values comprises: exclusively storing the selected subset of first values in the electronic memory.

In one embodiment, the step of operating the second one-dimensional inverse Fourier transform further comprises: storing a selected subset of second values in the electronic memory, wherein the selected subset of second values is defined by the data points that fall within an extent of the touch surface in the first spatial dimension.

In one embodiment, the step of operating the first one-dimensional inverse Fourier transform comprises repeatedly: retrieving, from the electronic memory, the Fourier coefficients for a line of data points with respect to the second frequency dimension, and operating the first one-dimensional inverse Fourier transform on the Fourier coefficients for the line of data points while adding fictitious data points with zero values of the Fourier coefficients so as to obtain the same number of data points in each line of data points. This embodiment reduces the required storage capacity of the electronic memory.

If the Fourier coefficients of the data points are stored sequentially, with the second frequency dimension as major order, in a set of memory elements of the electronic memory, and if the Fourier coefficients are repeatedly retrieved, from the set of memory elements, for lines of data points that have an increasing distance in the first frequency dimension with respect to an origin in the regular grid, at least part of the first values that are generated for each line of data points may be stored in the electronic memory by sequentially overwriting the set of memory elements. This embodiment enables in-place storage of the first values and thereby reduces the required storage capacity of the electronic memory.

In one embodiment, the step of processing the set of data samples comprises storing the Fourier coefficients in an array with the second frequency dimension as major order in the electronic memory.

In one embodiment, in which the first frequency dimension defines an upper and a lower half-plane in a Fourier domain, and the second frequency dimension defines a left and a right half-plane in the Fourier domain, the step of processing the set of data samples operates to compute and store, in the electronic memory, the Fourier coefficients of the data points within only one of the half-planes. In one implementation, said only one of the half-planes is the left or right half-plane.

In one embodiment, the step of storing at least part of the first values comprises: storing the first values in an array with the second frequency dimension as major order, and transposing the first values for storage in the array with the first frequency dimension as major order.

In one embodiment, the step of operating the second one-dimensional inverse Fourier transform comprises, repeatedly: retrieving, from the electronic memory, the first values for a line of data points with respect to the first frequency dimension, and operating the second one-dimensional inverse Fourier transform on the first values for the line of data points.

In one embodiment, each of the first and second one-dimensional inverse Fourier transforms is an inverse Fast Fourier Transform.

In one embodiment, the set of data samples is generated as a function of light that has propagated along the detection lines inside a light transmissive panel by internal reflections between a front surface and a rear surface, wherein the front surface defines the touch surface and allows the propagating light to be attenuated by interaction with touching objects.

A second aspect of the invention is a computer program product comprising computer code which, when executed on a data-processing system, is adapted to carry out the method of the first aspect.

A third aspect of the invention is a device for enabling touch determination based on an output signal of a touch-sensitive apparatus. The apparatus comprises a rectangular touch surface with first and second spatial dimensions and is configured to propagate signals across the touch surface along a plurality of detection lines. the device comprises: means for processing the output signal to generate a set of data samples indicative of transmitted signal energy for at least a subset of the plurality of detection lines; means for processing the set of data samples for transformation into Fourier coefficients arranged as data points on a regular grid defined by first and second dimension parameters that represent frequencies in the first and second spatial dimensions, respectively; and means for processing the data points by inverse Fourier transformation so as to generate an interaction pattern in the first and second spatial dimensions of the touch surface. The means for processing the data points comprises: means for operating a first one-dimensional inverse Fourier transform on the data points with respect to the second frequency dimension, so as to generate first values transformed into the second spatial dimension for the data points; and means for operating a second one-dimensional inverse Fourier transform on a selected subset of the first values with respect to the first frequency dimension to generate second values that represent the interaction pattern, wherein the selected subset is defined by the data points that fall within an extent of the touch surface in the second spatial dimension.

A fourth aspect of the invention is a touch-sensitive apparatus, comprising: a panel configured to conduct signals from a plurality of peripheral incoupling points to a plurality of peripheral outcoupling points, thereby defining detection lines that extend across a rectangular touch surface on the panel between pairs of incoupling and outcoupling points; means for generating the signals at the incoupling points; means for generating an output signal based on detected signals at the outcoupling points; and the device of the third aspect.

Any one of the above-identified embodiments of the first aspect may be adapted and implemented as an embodiment of the second to fourth aspects to attain the corresponding technical effects and advantages.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

The following example embodiments are directed to techniques that may improve processing speed and/or reduce the need for data storage in connection with Fourier-based image reconstruction in a touch-sensitive apparatus. Throughout the description, the same reference numerals are used to identify corresponding elements.

1. Touch-Sensitive Apparatus

Figure 1A:
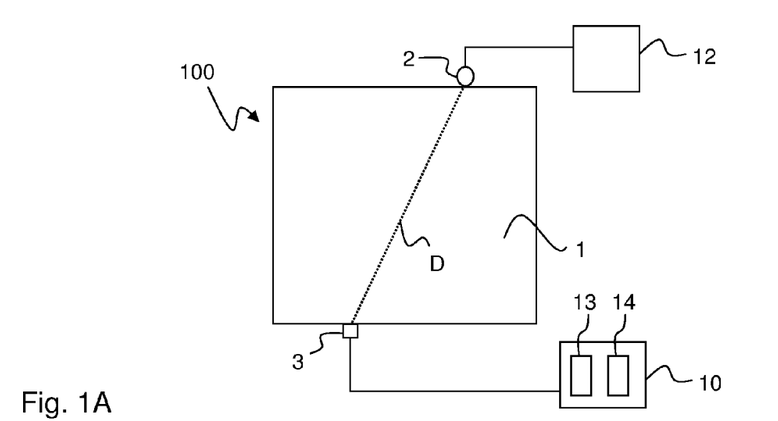
FIG. 1A is a top plan view of a touch-sensitive apparatus.

FIG. 1A illustrates a touch-sensitive apparatus 100 which is based on the concept of transmitting energy of some form across a touch surface 1, such that an object that is brought into close vicinity of, or in contact with, the touch surface 1 causes a local decrease in the transmitted energy. The touch-sensitive apparatus 100 includes an arrangement of emitters and sensors, which are distributed along the periphery of the touch surface. Each pair of an emitter and a sensor defines a detection line, which corresponds to the propagation path for an emitted signal from the emitter to the sensor. In FIG. 1A, only one such detection line D is illustrated to extend from emitter 2 to sensor 3, although it should be understood that the arrangement typically defines a more or less dense grid of intersecting detection lines, each corresponding to a signal being emitted by an emitter and detected by a sensor. Any object that touches the touch surface along the extent of the detection line D will thus decrease its energy, as measured by the sensor 3.

The arrangement of sensors (detectors) is electrically connected to a signal processor 10, which samples and processes an output signal from the arrangement. The output signal is indicative of the received energy (or an equivalent parameter, such as power or intensity) at each sensor 3. As will be explained below, the signal processor 10 may be configured to process the output signal by a tomographic technique to recreate a two-dimensional representation of the distribution of an interaction-related parameter (for simplicity, referred to as "interaction pattern" in the following) across the touch surface 1. The interaction pattern, which represents the local interaction with the signals that propagate across the touch surface, may be further processed by the signal processor 10 or by a separate device (not shown) for touch determination, which may involve extraction of touch data, such as a position (e.g. x, y coordinates), a shape or an area of each touching object.

In the example of FIG. 1A, the apparatus 100 also includes a controller 12 which is connected to selectively control the activation of the emitters 2 and, possibly, the readout of data from the sensors 3. The signal processor 10 and the controller 12 may be configured as separate units, or they may be incorporated in a single unit. As indicated, the signal processor 10 may include a processing unit 13 that operates in association with an electronic memory 14.

From the point of view of tomographic reconstruction, the touch surface 1 has ideally a circular shape. However, in practical applications, the touch surface is typically non-circular, e.g. rectangular as shown. For example, the shape of the touch surface 1 may be given by consideration of cost, ease of manufacture and installation, design, form factor, etc. Furthermore, if the touch surface 1 is overlaid on or integrated in a rectangular display device, the touch surface 1 is likely to also be designed with a rectangular shape. As will be described in further detail below, the tomographic reconstruction may be optimized for the non-circular shape of the touch surface 1 to speed up the processing and/or reduce the required footprint of the electronic memory.

The apparatus 100 may be configured to permit transmission of energy in one of many different forms. The emitted signals may thus be any radiation or wave energy that can travel in and across the touch surface 1 including, without limitation, light waves in the visible or infrared or ultraviolet spectral regions, electrical energy, electromagnetic or magnetic energy, or sonic and ultrasonic energy or vibration energy.

Figure 1B:
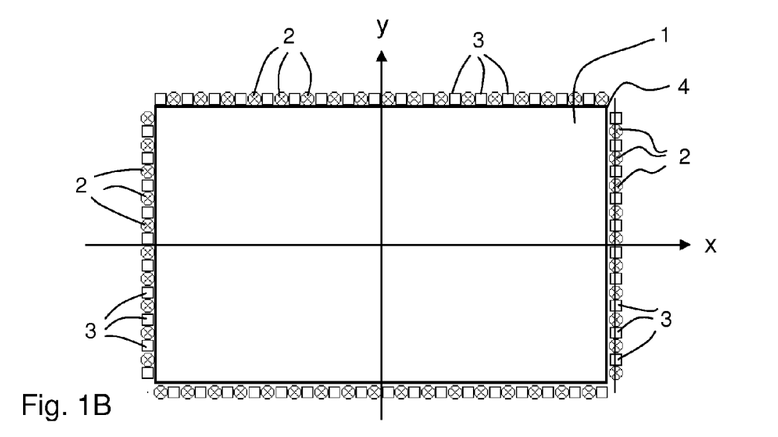
FIG. 1B is a top plan view of an FTIR-based touch-sensitive apparatus with an interleaved arrangement of emitters and sensors.

Embodiments of the invention may, e.g., be applied in an apparatus 100 that operates by frustrated total internal reflection (FTIR), as described in the Background section. FIG. 1B illustrates an example of such an "FTIR system", which has an "interleaved arrangement" of emitters 2 and sensors 3, i.e. the emitters 2 and sensors 3 are placed one after the other along the periphery of a light transmissive panel 4, which defines the surface 1. Light generated by the emitters 2 is coupled into the panel 4 at a plurality of incoupling points (ports), propagates by TIR inside the panel 4, and is detected by the sensors 3 at plurality of outcoupling points (ports). The light is coupled into the panel 4 in the shape of a beam or wave that diverges in the plane of the touch surface 1, and the sensors 3 are arranged to receive light over a wide range of angles (field of view). Thereby, each emitter 2 transmits light to a plurality of sensors 3, and each sensor 3 receives light from a plurality of emitters 2.

It is to be understood that FIG. 1B merely illustrates one example of an FTIR system. Further examples of FTIR systems are e.g. disclosed in US6972753, US7432893, US2006/0114237, US2007/0075648, WO2009/048365, WO2010/006882, WO2010/006883, WO2010/006884, WO2010/006885, WO2010/006886, WO2010/064983, and WO2010/134865, which are all incorporated herein by this reference. The inventive concept may be advantageously applied to such alternative FTIR systems as well.

2. Fourier-Based Reconstruction in Touch-Sensitive Apparatus

Fourier-based reconstruction techniques make use of the mathematical theorem called Projection-Slice Theorem. This Theorem states that given a two-dimensional function $f(x, y)$, the one- and two-dimensional Fourier transforms $\mathcal{F}_1$ and $\mathcal{F}_2$, a projection operator $\mathcal{R}$ that projects a two-dimensional (2D) function onto a one-dimensional (1D) line, and a slice operator $S_1$ that extracts a central slice of a function, the following calculations are equal:

$$\mathcal{F}_1 \mathcal{R} f(x,y) = S_1 \mathcal{F}_2 f(x,y)$$

Figure 2:
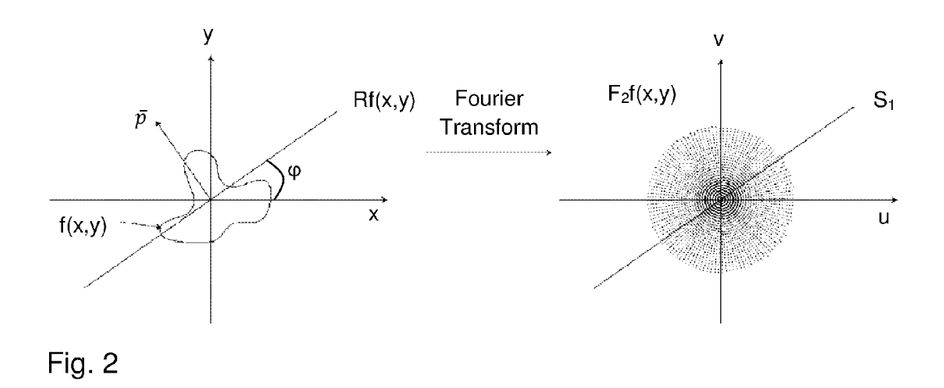
FIG. 2 illustrates the underlying principle of the Projection-Slice Theorem.

This relation is illustrated in FIG. 2. The right-hand side of the equation above essentially extracts a 1D line (a slice) of the 2D Fourier transform of the function $f(x, y)$. The line passes through the origin of the Fourier domain, as shown in the right-hand part of FIG. 2. The left-hand side of the equation starts by projecting (i.e. integrating along 1D lines in the projection direction $\bar{p}$) the 2D function onto a 1D line (orthogonal to the projection direction $\bar{p}$), which forms a "projection" that is made up of the projection values for all the different detection lines extending in the projection direction $\bar{p}$. Thus, taking a 1D Fourier transform of the projection gives the same result as taking a slice from the 2D Fourier transform of the function $f(x, y)$. In the context of the following disclosure, the function $f(x, y)$ corresponds to the interaction pattern $\alpha(x, y)$, which is to be reconstructed.

Figure 3:
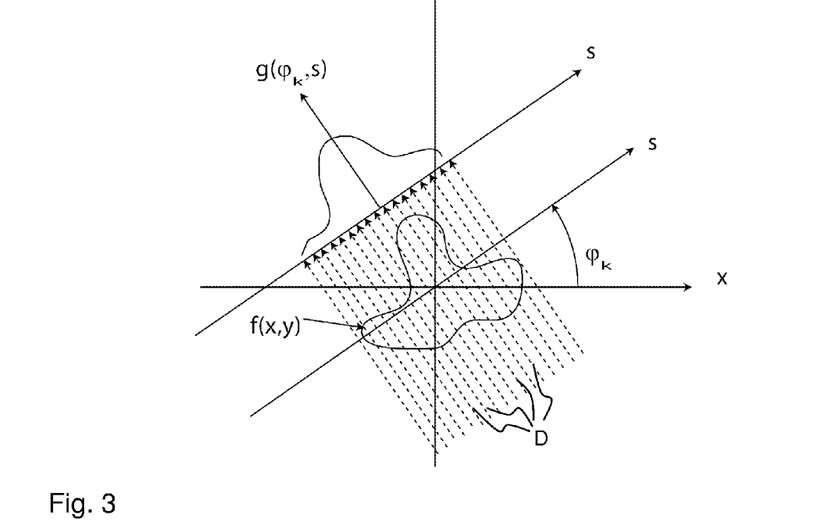
FIG. 3 illustrates a measurement system used for conventional tomographic analysis.

In tomographic processing, the reconstruction algorithms presume a specific geometric arrangement of the detection lines. In conventional tomography, e.g. as used in the field of medical imaging, the measurement system (i.e. the location of the incoupling points and/or outcoupling points) is controlled or set to yield the desired geometric arrangement of detection lines. Such a measurement system is exemplified in FIG. 3. Here, the system measures projection values of a set of detection lines for a given angle $\phi_k$. In FIG. 3, the set of detection lines D are indicated by dashed arrows, and the resulting projection is represented by the function $g(\phi_k, s)$. The measurement system is then rotated slightly around the origin of the x, y coordinate system in FIG. 3, to collect projection values for a new set of detection lines at this new rotation angle. As shown by the dashed arrows, all detection lines are parallel to each other for each rotation angle $\phi$.

The set of projection values collected for different angles and distances may be stacked together to form a "sinogram". The sinogram is generally given in a 2D sample space defined by dimensions that uniquely assign each projection value to a specific detection line. For example, the sample space may be defined by the above-mentioned angle and distance parameters $\phi$, s.

Figure 4A:
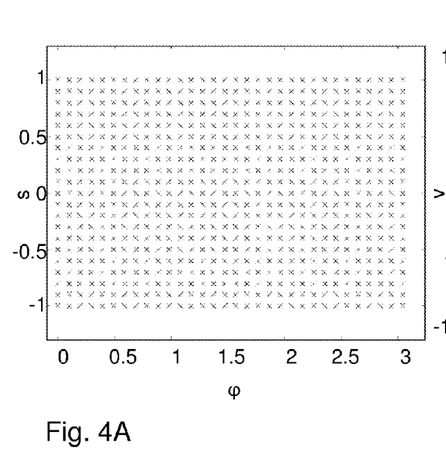
FIG. 4A is a sinogram obtained by the measurement system in FIG. 3 with uniform sampling.

To further exemplify the tomographic processing, consider a geometric arrangement in which the projection values are sampled with equal spacing in the angle and distance parameters $\phi$, s, resulting in a sinogram as shown in FIG. 4A. The sinogram thus represents the function $g(\phi, s)$, and every cross in FIG. 4A corresponds to a detection line and is associated with a measured projection value.

The Projection-Slice Theorem states that taking a 1D Fourier transform of a projection, i.e. for a given value of the $\phi$ parameter, gives the same result as taking a slice from the 2D Fourier transform of the function $f(x, y)$. This means that the 1D Fourier transform of each column in the sinogram of FIG. 4A results in a slice of data points in the Fourier domain. Theoretically, the 2D Fourier transform of $f(x, y)$ is given by:

$$F(u, v) = \int_{-\infty}^{\infty} \int_{-\infty}^{\infty} f(x, y) \cdot e^{-2\pi i \cdot (x \cdot u + y \cdot v)} dx dy$$

where u and v are dimension parameters that represent frequency in the x direction and y direction, respectively. Since $f(x, y)$ is represented by discrete data samples, F(u, v) is rather given by a corresponding discrete 2D Fourier transform, as is well-known to the person skilled in the art.

Figure 4B:
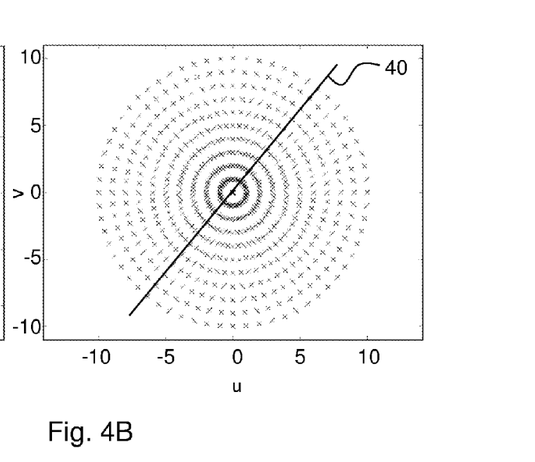
FIG. 4B is a 2D representation in the Fourier domain of the sampling points in FIG. 4A.

Each data point in such a slice of data points has a location given by specific frequency values of the dimension parameters u, v and is associated with a complex value corresponding to the Fourier coefficient of this specific location. All of the slices extend through the origin of the Fourier domain and the number of data points (outside the origin) on each slice may be equal to the number of sampling points (projection values) in the respective column of the sinogram. The number of data points may differ from the number of sampling points by the use of oversampling and zero-padding, as known to the person skilled in the art. FIG. 4B is a plot of the data points generated by discrete 1D Fourier transforms of the columns in FIG. 4A, with one slice being indicated by solid line 40. It should be noted that each data point (cross) in FIG. 4B is associated with a complex value indicative of amplitude and phase. According to the Projection-Slice Theorem, the frequency data in FIG. 4B represents the 2D Fourier transform $F(u, v)$ of the function $f(x, y)$. As seen in FIG. 4B, the frequency data $F(u, v)$ obtained from the data samples in the sinogram of FIG. 4A matches a polar grid in the Fourier domain (Fourier space), i.e. the data points in $F(u, v)$ are arranged in concentric circles around the origin, and each circle contains the same number of equiangularly spaced data points.

It is realized that the function $f(x, y)$ may be reconstructed by applying a Fourier inversion process to the frequency data $F(u, v)$, e.g. an inverse 2D FFT. However, since the interaction pattern is defined in a regular grid (x, y coordinate system), the polar distribution of discrete data points in $F(u, v)$ needs to be converted into a regular grid in the Fourier domain. As used herein a "regular grid" denotes a two-dimensional grid which is defined by mutually orthogonal grid lines with equal spacing in the respective dimension and in which the vertices (grid points) are addressed by two dimension parameter values. The grid lines thus define rectangular grid cells. A special case of a regular grid is a Cartesian grid, in which the grid cells are unit squares, and the vertices are defined by integer values. The conversion into a regular grid may be achieved in a number of different ways, e.g. as described in the above-referenced publications by Natterer and Fourmont. Further techniques for generating the frequency data $F(u, v)$ in a regular grid are found in "Mathematical Methods in Image Reconstruction", by F Natterer and F Wübbeling, 2001, in Chapter 5.2: "Fourier reconstruction". All of these publications are incorporated herein by reference. With reference to the latter publication, it may be noted that also the pseudo-polar distribution of data points generated by the so-called linogram algorithm may be converted into a regular grid by suitable interpolation in the Fourier domain.

Figure 5:
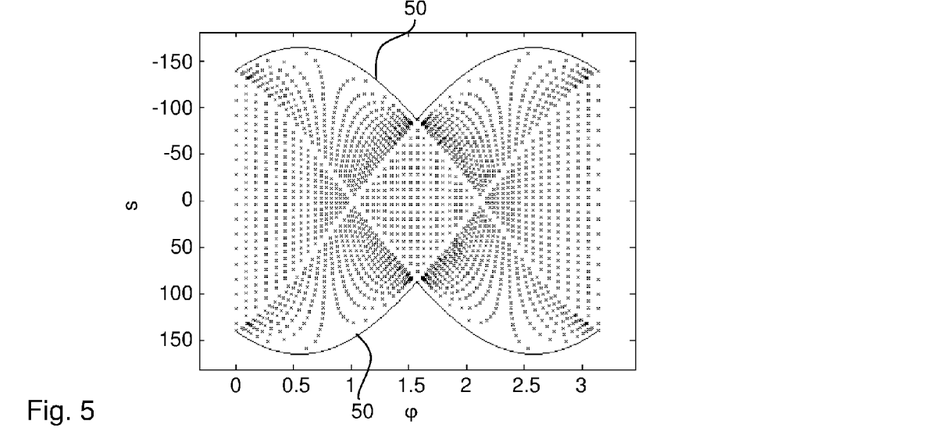
FIG. 5 is a sinogram defined by the interleaved arrangement in FIG. 1B.

Reverting now to the touch-sensitive apparatus 100, as exemplified by the interleaved arrangement in FIG. 1B, it is realized that the detection lines do not fully correspond to the projection measurements of the conventional measurement system in FIG. 3. FIG. 5 is a sinogram for the interleaved system in FIG. 1B. As seen, the sampling points (corresponding to detection lines, and thus to measured projection values) are irregularly arranged in the sample space ($\phi$, s coordinate system). Also, the sampling points are only available in part of the sample space. The solid lines 50 indicate the physical limits of the touch surface, and outside of these lines there are no sampling points.

The irregular sampling points make it difficult to generate a 2D Fourier transform of the sinogram. This may be overcome by processing the projection values of the sampling points in FIG. 5 according to the matching techniques described in aforesaid WO 2011/139213 to generate projection values for a set of matched samples in a regular arrangement in the sample space, e.g. as shown in FIG. 4A. There are typically no projection values outside the solid lines 50 in FIG. 5, although it is possible to design the matching technique so as to provide matched samples also outside the lines 50, e.g. by extrapolation as described in WO2011/139213.

Figure 6:
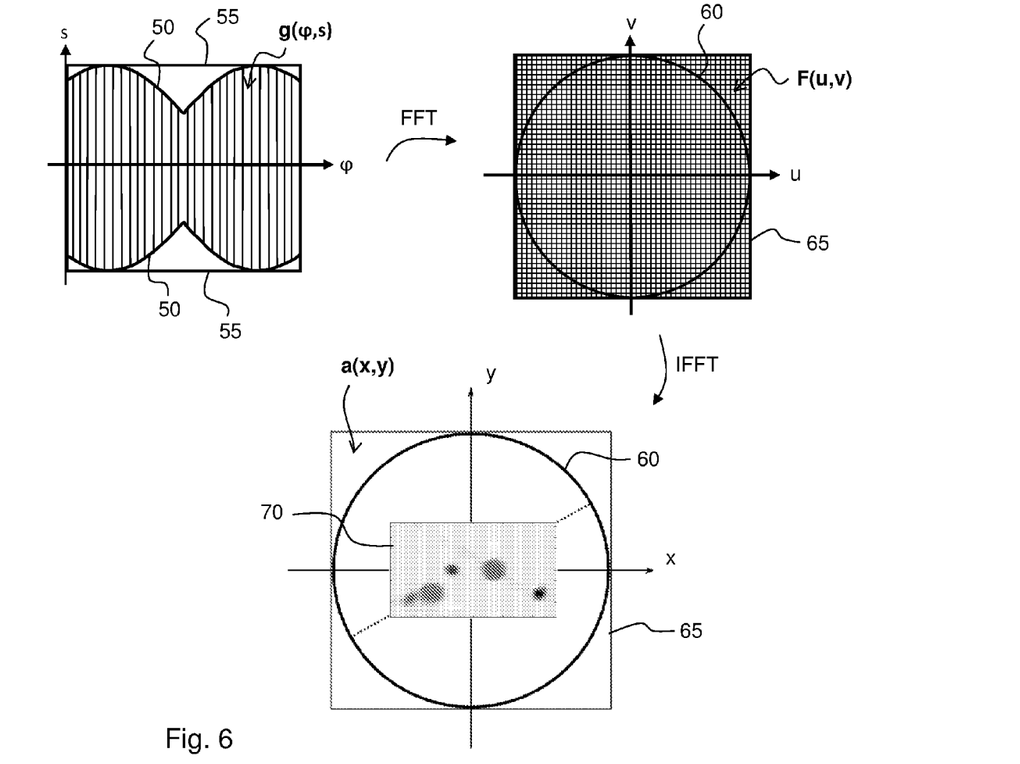
FIG. 6 illustrates a process for Fourier-based reconstruction of an interaction pattern from a sinogram of projection values.

FIG. 6 gives an overview of the reconstruction process described in the foregoing. The illustrated process starts from a sinogram $g(\phi, s)$, in which the projection values form columns (indicated by vertical lines) with respect to the s variable. The projection values in the sinogram are processed by Fourier transformation (indicated by FFT in FIG. 6), and possibly additional measures, so as to generate the frequency data $F(u, v)$ consisting of Fourier coefficients at data points arranged in a regular grid (indicated by patterned area). The circle 60 indicates the subset of the frequency data $F(u, v)$ that corresponds to a complete set of sampling points, i.e. a complete sinogram bounded by lines 55. The person skilled in the art realizes that the circle 60 circumscribes the actual touch surface and defines the theoretical extent of the touch surface if designed in accordance with the underlying theory of the Projection-Slice Theorem (which presumes that the measurement system is rotated a full revolution along a circular path). The square 65 indicates the required minimum limits of the frequency data $F(u, v)$ when generating the interaction pattern $a(x, y)$ by inverse Fourier transformation. This means that the Fourier coefficients of the data points outside the circle 60 are set to a zero, so as to allow the inverse Fourier transformation to operate on the same number of data points in the columns and rows, respectively, in the regular grid. The frequency data $F(u, v)$ is then processed by inverse Fourier transformation (indicated by IFFT in FIG. 6), so as to generate the interaction pattern $a(x, y)$. As indicated, the outer limits of the resulting pattern $a(x, y)$ corresponds to the outer limits of the frequency data $F(u, v)$, designated by the square 65, which circumscribes the circle 60, i.e. the theoretical extent of the touch surface. The region that corresponds to the actual touch surface 1 in the interaction pattern is indicated by 70. In embodiments of the invention, described in Section 3, the reconstruction process is tailored to only reconstruct the interaction pattern $a(x, y)$ within the region of interest 70, thereby reducing the number of processing operations in the reconstruction processing. The spacing between the region 70 and the circle 60, indicated by dotted lines, is given by the degree of oversampling introduced when generating the frequency data $F(u, v)$, e.g. to achieve a desired spatial resolution of the interaction pattern $a(x, y)$, as is well-known in the art.

3. Optimizations of Fourier-Based Reconstruction

This section presents an embodiment of the Fourier-based reconstruction process with various optimizations with respect to the computation of the 2D inverse Fourier transform of the frequency data $F(u, v)$. The following example presumes that the touch surface is rectangular and has a major extension in the x dimension and a minor extension in the y dimension, e.g. as shown in FIG. 1B, and that the frequency data $F(u, v)$ is arranged on a Cartesian grid in the Fourier domain. It is also presumed that the 2D inverse Fourier transform is implemented as two consecutive runs of a 1D inverse FFT with respect to the frequency parameters u and v, respectively. Thus, the first run (or pass) computes the 1D inverse FFT for either all rows or columns in $F(u, v)$, resulting in partially transformed data or "first values". The second run (or pass) computes the 1D inverse FFTs on the result from the first step but in the other direction, resulting in interaction values or "second values". It is also presumed that the Fourier coefficients of the data points in $F(u, v)$ are stored in a dedicated data structure in an electronic memory (cf. 14 in FIG. 1A) and are addressable by indices corresponding to values of u and v, respectively. Furthermore, the dedicated data structure is an array, which may be implemented by any type of conventional array structure, as well as equivalents such as balanced tree, a linked list, an Iliffe vector, etc. It is also to be understood that the real and imaginary parts of the Fourier coefficients may be stored in a common data structure or in separate data structures.

One optimization, with respect to data storage, is to utilize the symmetric property of the Fourier transforms and only store F(u, v) for a half-plane in the Fourier domain, when F(u, v) is generated based on the sinogram g(φ, s). This optimization is based on the understanding that both the sinogram g(φ, s) and the interaction pattern a(x, y) are real-valued functions.

Further optimization may be achieved by proper selection of half-plane. Since the 2D inverse FFT is implemented by two runs of a 1D inverse FFT, the number of 1D inverse FFT operations may be reduced by designing the first run to operate on columns of data in F(u, v) and the second run to operate only on relevant rows of data in F(u, v). The relevant rows of data are the rows that correspond to the extent of the touch surface 1 in the y direction. It is realized that the number of relevant rows are reduced if the first run operates on columns of data in F(u, v), since the columns correspond to the minor dimension of the touch surface 1. If the regular grid in the Fourier domain deviates from a Cartesian grid, i.e. if the resolution differs between the first and second frequency dimensions u, v, the optimization may be implemented to take the resolution into account so as to ensure that the first run operates in the direction that results in the smallest number of second runs.

The processing efficiency may be further optimized by storing F(u, v) column-major instead of row-major in the array. This will speed-up the retrieval of the Fourier coefficients during the first run.

Another optional optimization, with respect to data storage, is to refrain from storing, in the array, any data in F(u, v) that lies outside the circle spanned by the 1D FFTs of the sinogram, i.e. the circle 60 shown in FIG. 6. The Fourier coefficients outside the circle 60 is known to be zero, and these Fourier coefficients may instead be added on the fly, as needed, for each column during the first run.

Figure 7:
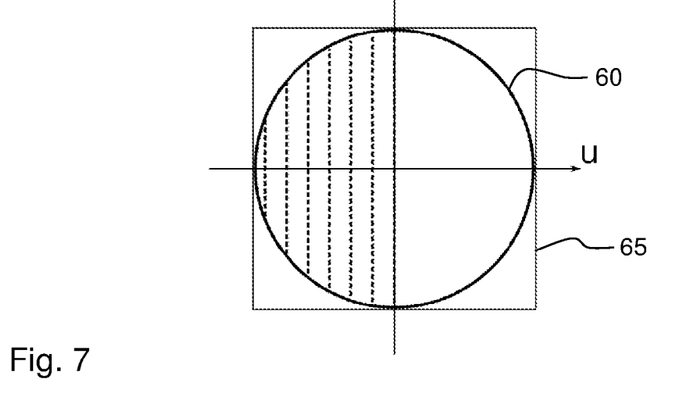
FIG. 7 illustrates a set of Fourier coefficients stored in memory during the process in FIG. 6.

The foregoing optimizations with respect to data storage are summarized in FIG. 7, which illustrate how the Fourier coefficients of F(u, v) are aligned and stored in the array. Like in FIG. 6, the square 65 represents the span of the Fourier coefficients that are used when computing the inverse 2D FFT, and the circle 60 represents the span of the Fourier coefficients that may be generated based on the sinogram g(φ, s). The dotted vertical lines illustrate data storage in the array, i.e. column-major mode with consecutive storage of column after column. As seen, the number of stored Fourier coefficients differ between the columns, since only data within the circle 60 is stored in the array.

Figure 8A:
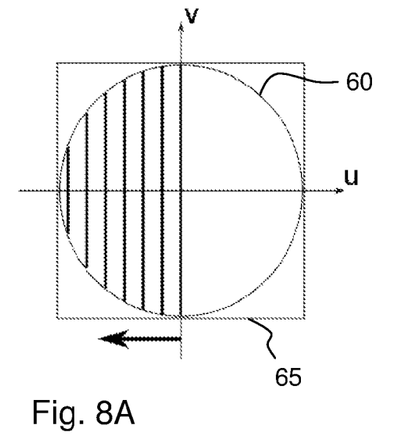
FIGS. 8A-8D illustrates data processing and data storage during inverse Fourier transformation of the set of Fourier coefficients in FIG. 7.
Figure 8B:
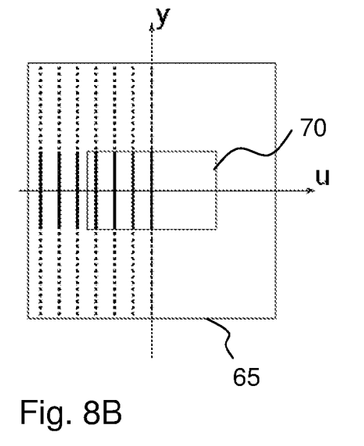

FIGS. 8A-8D may serve to further illustrate how the computation of the 2D inverse Fourier transform of the frequency data F(u, v) may be optimized with respect to processing speed and data storage. FIG. 8A illustrate how the data in FIG. 7 is processed in the first run. During the first run, Fourier coefficients for the data points in each column are retrieved from the array, while adding Fourier coefficients of zero value on the fly as needed outside the circle 60. The retrieval of the Fourier coefficients is optimized by the column-major storage in the array. The retrieved Fourier coefficients for each column are processed by the 1D inverse FFT to generate partially transformed data as shown in FIG. 8B. The partially transformed data (or "first values") is represented in a mixed domain, given by the frequency parameter u and the spatial parameter y. The second run then operates on a relevant subset of the partially transformed data, indicated by solid lines in FIG. 8B, namely the subset that falls within the extent of the touch surface 1 in the y direction. The remaining partially transformed data, indicated by dotted lines in FIG. 8B, may be computed but is not processed in the second run. It is conceivable that all partially transformed data is stored in memory during execution of the first run, but additional optimization may be achieved by only storing the relevant subset of the partially transformed data.

Figure 9:
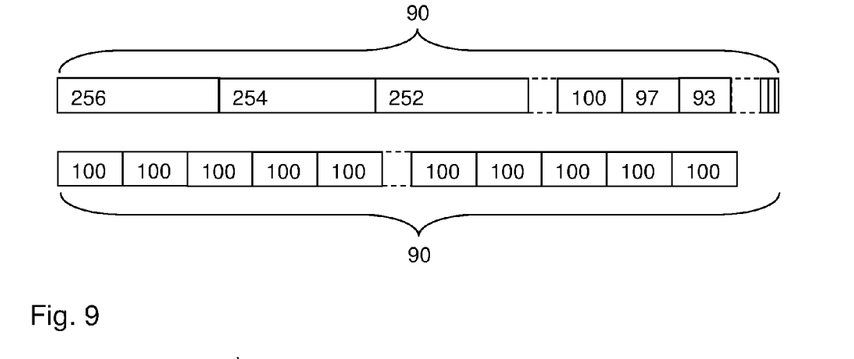
FIG. 9 illustrates in-place data storage of partially transformed data during the data processing in FIGS. 8A-8D.

Further optimization, with respect to data storage, may be achieved by in-place storage of the partially transformed data in the array, i.e. by sequentially overwriting the data in the array. As indicated by the horizontal arrow in FIG. 8A, the first run is designed to operate on columns of data in the array, from right to left in the Fourier domain, i.e. for increasing values of |u|. This means that the number of Fourier coefficients retrieved from the array gradually decreases for each column during the first run. Thereby, it is possible to store the relevant subset of the partially transformed data by sequentially overwriting the memory elements occupied by the array in the memory, starting from the beginning of the array. This is further illustrated in FIG. 9, which illustrates a segment 90 of memory elements, which may or may not be a contiguous part of the electronic memory. In the top part of FIG. 9, the segment 90 is used for storing the Fourier coefficients for consecutive columns in F(u, v) starting from the right-most column in FIG. 8A. Each column is represented by a box in the segment 90, and the number in each box designates the number of data points in each column, which is proportional to the required storage size for each column in the memory segment 90. The required storage size of each column is also represented by the length of the respective box in FIG. 9. The bottom part of FIG. 9 illustrates the content of the same segment 90 of memory elements after completion of the second run with sequential in-place storage of the relevant subset of the partially transformed data for each column. In this example, the relevant subset for each column contains 100 data points. As seen, it is possible to store the partially transformed data in-place without risk of overwriting the Fourier coefficients that have not yet been processed.

A further optimization, in terms of processing speed, may be achieved by transposing the data in the array when the first run is completed, such the array is stored in row-major before initiating the second run. This may serve to optimize the retrieval of the partially transformed data, since the 1D inverse FFT of the second run will operate on consecutive data in the array, as indicated by the solid lines in FIG. 8C. As indicated by the vertical arrow in FIG. 8C, the second run computes the 1D inverse FFT for each row of partially transformed data, to generate a corresponding row of interaction values ("second values"). The second run may be designed to utilize the symmetric property of the complex to real 1D inverse FFT to directly generate the rows of interaction values, or the partially transformed data (FIG. 8C) may first be mapped into the right half-plane by complex-conjugation and then processed by the 1D inverse FFT to yield the interaction values, as is well-known to the skilled person. Since the second run uses complex input to generate real output, the second run may be further optimized such that each 1D inverse FFT generates two rows of interaction values, using the "two for the price of one" method which is known to the skilled person.

Figure 8C:
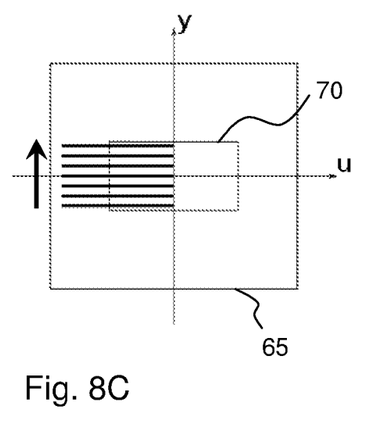
Figure 8D:
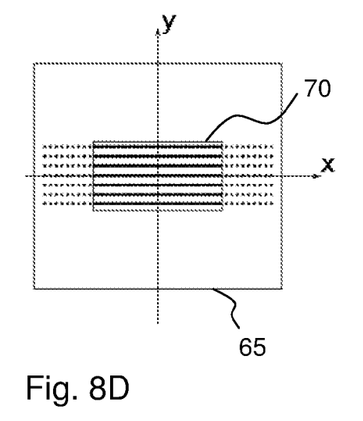

The interaction values within the region of interest 70, indicated by solid lines in FIG. 8D, may be stored in the memory, e.g. by in-place storage in the array, or may be directly output for further processing. The dotted lines in FIG. 8D represent interaction values that may be produced by the 1D inverse FFT but are discarded from storage and further processing.

Reverting now to FIG. 6, it is realized that a significant reduction in number of processing operations and need for data storage capacity may be achieved, since the reconstruction process is tailored to generate interaction values only within the region of interest 70, which is a subset of both the geometric span 65 of the Fourier coefficients used when computing the inverse 2D FFT, and the geometric span 60 of the Fourier coefficients generated based on the sinogram.

It is to be understood that the above example is equally applicable if the touch surface 1 is arranged with its major dimension in the y direction, whereby the first run operates on columns corresponding to the major dimension instead of the minor dimension of the touch surface 1. By limiting the processing in the second run to the relevant rows of the partially transformed data, the number of processing operations may be reduced, albeit to a lesser degree than in the above example. If the touch surface 1 is arranged with its major dimension in the y direction, the reconstruction process may alternatively be modified to operate on the upper or lower half-plane of the Fourier domain, store the Fourier coefficients as row-major, operate the first run on rows of Fourier coefficients, transpose the result into column-major, and operate the second run on columns of partially transformed data. From this follows that the above example is also applicable to a square touch surface, which lacks major/minor dimensions, since it is still possible to operate the second run on a subset of the partially transformed data so as to reduce the number of processing operations.

4. Operation and Hardware

Figure 10A:
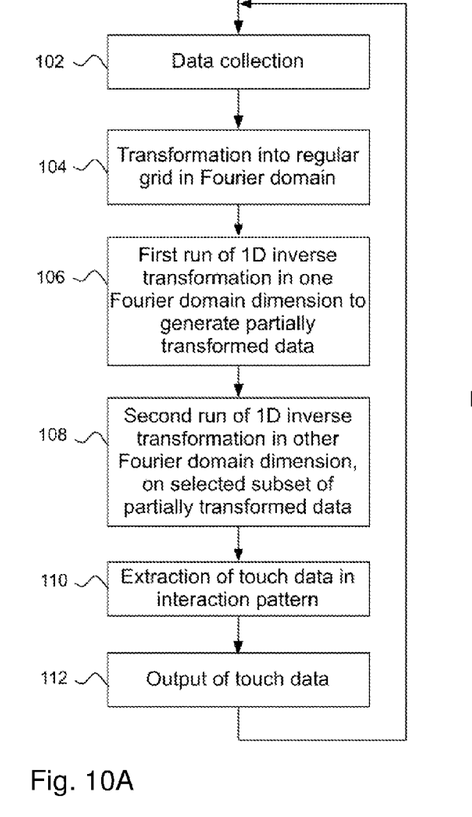
FIG. 10A is a flow chart of a touch determination method.

FIG. 10A illustrates an embodiment of a method for touch data extraction in the touch-sensitive apparatus 100 of FIG. 1A. The method involves a sequence of steps 102-114 that are repeatedly executed by the data processing device 10. Each sequence of steps 102-114 forms a "frame".

Each frame starts by a data collection step 102, in which measurement values are sampled from the sensors 3. Step 102 results in one projection value for each detection line. It may be noted that the measurement values may, but need not, be acquired for all available detection lines in the apparatus 100. Step 102 may also include pre-processing of the measurement values, e.g. filtering for noise reduction, conversion of measurement values into transmission values (or equivalently, attenuation values), conversion into logarithmic values, etc.

In a transformation step 104, the projection values are processed to generate the above-mentioned frequency data F(u, v) consisting of Fourier coefficients for data points on a regular grid in the Fourier domain. Step 104 may comprise a sub-step of processing the projection values for generation of matched samples, as mentioned above with reference to WO2011/139213, and a sub-step of converting the matched samples into the frequency data F(u, v). As noted above, step 104 may store the frequency data F(u, v) for only a half-plane in the Fourier domain. Step 104 may also involve further processing of the frequency data F(u, v), e.g. by applying a low-pass filter, as well known to the skilled person.

In a first 1D inversion step 106, a first run of a 1D inverse Fourier transform is executed on the frequency data F(u, v) with respect to the v direction, so as to generate the partially transformed data, e.g. as exemplified with reference to FIGS. 8A-8C. Thus, in step 106, the 1D inverse Fourier transformation is operated column-wise on the frequency data F(u, v), i.e. on the data points in the v direction that are associated with a respective value of the frequency parameter u.

In a second 1D inversion step 108, a second run of the 1D inverse Fourier transform is executed on the partially transformed data with respect to the u direction, but only for the data points that fall within the extent of the touch surface in the y direction, e.g. as exemplified with reference to FIGS. 8C-8D. Thereby, step 108 results an interaction pattern within the extent of the touch surface. Thus, in step 108, the 1D inverse Fourier transformation is operated row-wise on the partially transformed data, i.e. on the data points in the u direction that are associated with a respective value of the spatial parameter y.

In an extraction step 110, the interaction pattern is processed for identification of touch-related features and extraction of touch data. Any known technique may be used for isolating true (actual) touches within the interaction pattern. For example, ordinary blob detection and tracking techniques may be used for finding the actual touches, including thresholding, clustering, edge detection, shape matching, etc. Any available touch data may be extracted, including but not limited to x, y coordinates, areas and shapes of the touches.

In step 112, the extracted touch data is output, and the process returns to the data collection step 102.

It is to be understood that one or more of steps 102-112 may be effected concurrently. For example, the data collection step 102 of a subsequent frame may be initiated concurrently with any of steps 104-112.

Figure 10B:
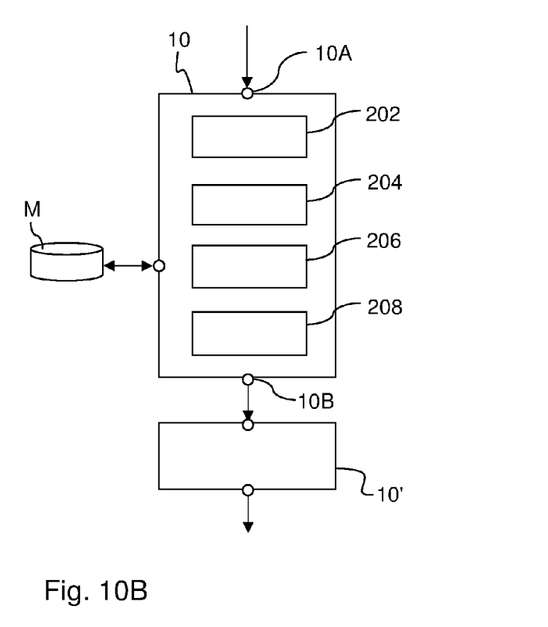
FIG. 10B is a block diagram of hardware that implements the method of FIG. 10A.

FIG. 10B shows an example of a device 10 configured to implement the process in FIG. 10A. The device 10 includes an input 10A for receiving the output signal. The device 10 further includes a data collection element (or means) 202 for generating the current projection values, a transformation element (or means) 204 for generating F(u, v) on a regular grid, a first 1D inversion element (or means) 206 for generating the partially transformed data, a second 1D inversion element (or means) 208 for generating the current interaction pattern based on a selected subset of the partially transformed data, and an output 10B for outputting the interaction values. In the example of FIG. 10B, the extraction of touch data is carried out by a separate device 10' which is connected to receive the interaction values from the device 10.

The device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction, but serve as another element/means when executing another instruction. In addition, one element/means may be implemented by one instruction in some cases, but by a plurality of instructions in some other cases. Naturally, it is conceivable that one or more elements (means) are implemented entirely by analog hardware components.

The software controlled device 10 may include one or more processing units (cf. 13 in FIG. 1A), e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The device 10 may further include a system memory (cf. 14 in FIG. 1A) and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software and any predefined data needed during execution, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The device 10 may include one or more communication interfaces, such as a serial interface, a parallel interface, a USB interface, a wireless interface, a network adapter, etc, as well as one or more data acquisition devices, such as an A/D converter. The special-purpose software may be provided to the device 10 on any suitable computer-readable medium, including a record medium, and a read-only memory.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For example, the generation of the frequency data $F(u, v)$, which is mapped to a regular grid in the Fourier domain, may be achieved in any conceivable way starting from any conceivable arrangement of detection lines. The generation of matched samples may be omitted if the apparatus 100 is designed with a suitable arrangement of detection lines, or the matched samples may be generated by simply assigning each projection value to the nearest matched sample. Although the matched samples typically define lines of sampling points with respect to the angle parameter $\phi$, the matched samples within each line may have any spacing (uniform or non-uniform), and the lines may have any spacing (uniform or non-uniform).

It is also to be understood that the frequency data $F(u, v)$ may be generated without the above-mentioned oversampling. It is also conceivable that the frequency data $F(u, v)$ is generated with a degree of undersampling. To represent the presence of undersampling, FIG. 6 may be modified such that the circle 60 touches the corners of the region of interest 70, and that the sides of the square 65 is smaller than the diameter of the circle 60. The square 65 still extends outside the region of interest 70, and the skilled person realizes that all of the above-described optimizations are equally applicable when the frequency data $F(u, v)$ is generated by undersampling.

The invention claimed is:

1. A method of enabling touch determination based on an output signal from a touch-sensitive apparatus, the touch-sensitive apparatus including a rectangular touch surface with first and second spatial dimensions, the rectangular touch surface configured to propagate signals across the rectangular touch surface along a plurality of detection lines, said method comprising:
    processing the output signal to generate a set of data samples indicative of transmitted signal energy for at least a subset of the plurality of detection lines;
    processing the set of data samples for transformation into Fourier coefficients arranged as data points on a grid defined by first and second frequency dimension parameters that represent frequencies in the first and second spatial dimensions, respectively; and
    processing the data points by inverse Fourier transformation to generate an interaction pattern in the first and second spatial dimensions of the rectangular touch surface;
    wherein the processing the data points includes
        operating a first one-dimensional inverse Fourier transform on the data points with respect to the second frequency dimension to generate first values transformed into the second spatial dimension for the data points, and
        operating a second one-dimensional inverse Fourier transform on a selected subset of the first values with respect to the first frequency dimension to generate second values that represent the interaction pattern, the selected subset defined by the data points within an extent of the rectangular touch surface in the second spatial dimension.

2. The method of claim 1, wherein an extent of the rectangular touch surface in the first spatial dimension exceeds the extent of the rectangular touch surface in the second spatial dimension.

3. The method of claim 1, further comprising:
    storing at least part of the first values in an electronic memory; and
    retrieving the at least part of the first values from the electronic memory for operating the second one-dimensional inverse Fourier transform.

4. The method of claim 3, wherein the storing at least part of the first values comprises:
    exclusively storing the selected subset of the first values in the electronic memory.

5. The method of claim 3, further comprising:
    storing a selected subset of the second values in the electronic memory; wherein
        the selected subset of the second values is defined by the data points within an extent of the rectangular touch surface in the first spatial dimension.

6. The method of claim 3, further comprising:
    repeatedly retrieving, from the electronic memory, the Fourier coefficients for a line of data points with respect to the second frequency dimension; and
    wherein the operating the first one-dimensional inverse Fourier transform includes repeatedly operating the first one-dimensional inverse Fourier transform on the Fourier coefficients for the line of data points while adding fictitious data points with zero values of the Fourier coefficients to obtain the same number of data points in each line of data points.

7. The method of claim 6, further comprising:
    sequentially storing the Fourier coefficients, with the second frequency dimension as major order, in a set of memory elements of the electronic memory; wherein
        the repeatedly retrieving includes repeatedly retrieving the Fourier coefficients from the set of memory elements, for lines of data points that have an increasing distance in the first frequency dimension with respect to an origin in the grid, and at least part of the first values that are generated for each line of data points are stored in the electronic memory by sequentially overwriting the set of memory elements.

8. The method of claim 3, further comprising:
storing the Fourier coefficients in an array with the second frequency dimension as major order in the electronic memory.

9. The method of claim 3, wherein
the first frequency dimension defines an upper and a lower half-plane in a Fourier domain;
the second frequency dimension defines a left and a right half-plane in the Fourier domain; and
the processing the set of data samples operates to compute and store, in the electronic memory, the Fourier coefficients for the data points within only one of the half-planes.

10. The method of claim 9, wherein said only one of the half-planes is the left or right half-plane.

11. The method of claim 3, wherein the storing at least part of the first values comprises:
storing the first values in an array with the second frequency dimension as major order; and
transposing the first values for storage in the array with the first frequency dimension as major order.

12. The method of claim 3, further comprising:
repeatedly retrieving, from the electronic memory, the first values for a line of data points with respect to the first frequency dimension; and wherein
the operating the second one-dimensional inverse Fourier transform includes repeatedly operating the second one-dimensional inverse Fourier transform on the first values for the line of data points.

13. The method of claim 1, wherein each of the first and second one-dimensional inverse Fourier transforms is an inverse Fast Fourier Transform (FFT).

14. The method of claim 1, wherein
the set of data samples is a function of light that has propagated along the plurality of detection lines inside a light transmissive panel by internal reflections between a front surface and a rear surface; and
the front surface defines the rectangular touch surface and allows the propagating light to be attenuated by interaction with touching objects.

15. A non-transitory computer-readable storage medium storing computer code which, when executed on a data-processing system, causes the data-processing system to carry out the method of claim 1.

16. A device for enabling touch determination based on an output signal of a touch-sensitive apparatus, the touch-sensitive apparatus including a rectangular touch surface with first and second spatial dimensions, and the touch-sensitive apparatus configured to propagate signals across the rectangular touch surface along a plurality of detection lines, said device comprising:
means for processing the output signal to generate a set of data samples indicative of transmitted signal energy for at least a subset of the plurality of detection lines;
means for processing the set of data samples for transformation into Fourier coefficients arranged as data points on a grid defined by first and second frequency dimension parameters that represent frequencies in the first and second spatial dimensions, respectively; and
means for processing the data points by inverse Fourier transformation to generate an interaction pattern in the first and second spatial dimensions of the rectangular touch surface;
wherein the means for processing the data points includes
means for operating a first one-dimensional inverse Fourier transform on the data points with respect to the second frequency dimension to generate first values transformed into the second spatial dimension for the data points, and
means for operating a second one-dimensional inverse Fourier transform on a selected subset of the first values with respect to the first frequency dimension to generate second values that represent the interaction pattern, the selected subset defined by the data points within an extent of the rectangular touch surface in the second spatial dimension.

17. A device for enabling touch determination based on an output signal of a touch-sensitive apparatus, the touch-sensitive apparatus including a rectangular touch surface with first and second spatial dimensions, and the touch-sensitive apparatus configured to propagate signals across the rectangular touch surface along a plurality of detection lines, said device comprising:
at least one processor configured to execute computer-readable instructions to
process the output signal to generate a set of data samples indicative of transmitted signal energy for at least a subset of the plurality of detection lines;
process the set of data samples for transformation into Fourier coefficients arranged as data points on a grid defined by first and second frequency dimension parameters that represent frequencies in the first and second spatial dimensions, respectively;
process the data points by inverse Fourier transformation to generate an interaction pattern in the first and second spatial dimensions of the rectangular touch surface;
wherein the at least one processor is further configured to execute the computer-readable instructions to process the data points by
operating a first one-dimensional inverse Fourier transform on the data points with respect to the second frequency dimension to generate first values transformed into the second spatial dimension for the data points, and
operate a second one-dimensional inverse Fourier transform on a selected subset of the first values with respect to the first frequency dimension to generate second values that represent the interaction pattern, the selected subset defined by the data points within an extent of the rectangular touch surface in the second spatial dimension.

18. A touch-sensitive apparatus, comprising:
a device for enabling touch determination according to claim 17;
a panel configured to conduct the signals from a plurality of peripheral incoupling points to a plurality of peripheral outcoupling points, thereby defining the plurality of detection lines that extend across the rectangular touch surface on the panel between pairs of the plurality of peripheral incoupling and outcoupling points;
a plurality of emitters configured to generate the signals at the plurality of peripheral incoupling points; and a plurality of detectors configured to generate the output signal based on detected signals at the plurality of peripheral outcoupling points.

* * * * *